(No Model.)
J. WODISKA.
FILTER.
No. 247,865. Patented Oct. 4, 1881.
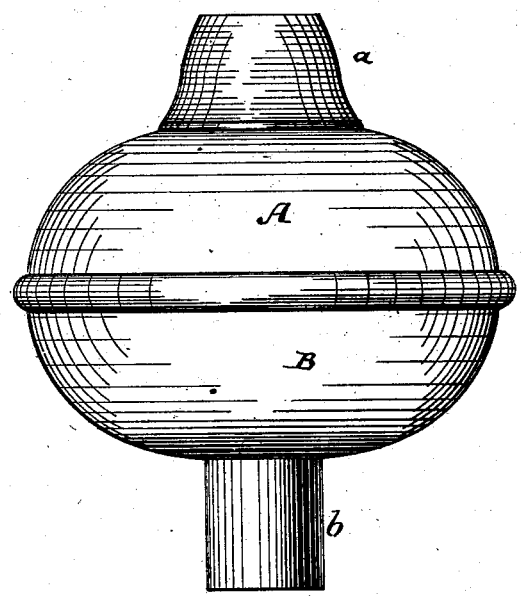
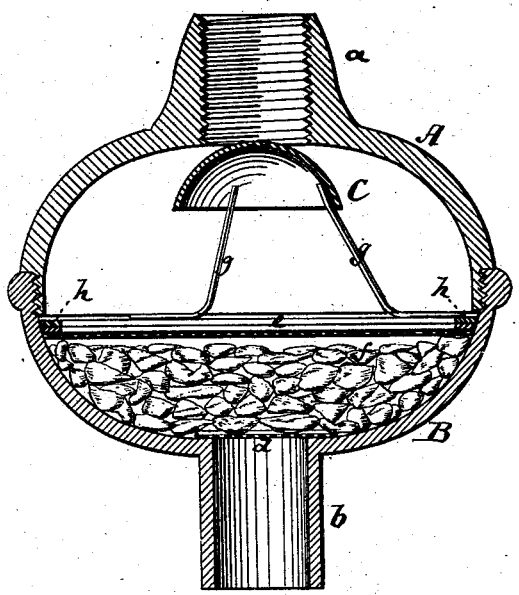
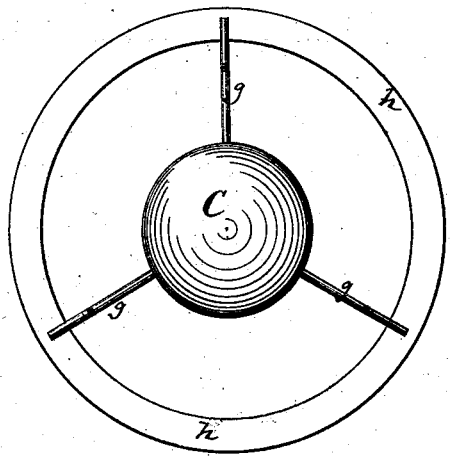
Witnesses:
Henry F. Parker.
Willy E. E. Schutz.
Inventor:
Julius Wodiska
by his attorneys
Briesen & Ketter

UNITED STATES PATENT OFFICE.

JULIUS WODISKA, OF NEW YORK, N. Y.

FILTER.

SPECIFICATION forming part of Letters Patent No. 247,865, dated October 4, 1881.

Application filed July 26, 1881. (No model.)

*To all whom it may concern:*

Be it known that I, JULIUS WODISKA, of New York, in the county and State of New York, have invented an Improved Filter, of which the following is a specification.

Figure 1 is a side view of my filter; Fig. 2, a vertical central section of the same, and Fig. 3 a top view of the spreading-plate contained therein.

This invention relates to a filter attachment to water-pipes and faucets; and it consists in the combination of a sectional shell, having supply and discharge pipes, with an interior convex spreading-plate held on legs in the upper part of the shell, and with a sieve or sieves placed into the lower part of the shell, all as hereinafter more fully described.

In the drawings, the letter A represents the upper, and the letter B the lower, part of the shell of my improved filter. The upper part, A, which is preferably of semi-spherical form, or nearly so, carries the upwardly-projecting supply-pipe $a$, which is of much less diameter than the body of the part A, and in the same manner is the lower shell, B, provided with the downwardly-projecting discharge pipe or nozzle $b$, which also is of much less diameter than the part B. The two parts A and B are threaded, so that they may be secured together, as shown, and when so united they form a nearly spherical receptacle of larger diameter than the pipes $a$ and $b$, through which the water reaches and escapes from the filter. The pipe $a$ is, by preference, also threaded, so that it can be readily screwed to the end of the main supply-pipe or to a faucet or the like. The lower part of the shell B contains two sieves, $d$ and $e$, and between them a suitable packing or filling, $f$, of coke or other filtering and purifying material; but instead of two sieves and the filling $f$ there may be no filling at all, or only one sieve or strainer, or a larger number of sieves or strainers. The upper sieve, $e$, when two or used, should be loosely placed in the shell B, so that it can be readily taken out to permit the cleaning of the shell.

C is the spreading-plate. This is preferably a semi-spherical solid plate or half a ball, placed with its convex side upward into the shell A, directly beneath the pipe $a$. It may be suspended in suitable manner from any part of the shell A; but I prefer to provide it with downwardly-projecting legs $g$, that are fastened to a ring, $h$, which is set into the lower shell, B, and which, when the sieve $e$ is used, would rest upon the said sieve, and locked fast by the part A, as shown.

The object of the plate C is to spread the water that reaches the filter through the pipe $a$ and diffuse it over the entire area of the diffusing-sieve or filtering substance contained in the shell. Were it not for the plate C, the tendency of the water would be to reach the sieve in the center only, and therefore the benefit of the entire area of the filter would be apt to be lost to a greater or less extent; but by employing the plate C the entire area of the filter is utilized to the best advantage.

I am aware that dish-shaped plates have been used in filters, as in Patent No. 40,620. Such plates, being placed with the convex side downward, retain the water and pollute the entire filter if it is not used for a greater or less length of time; nor do I claim perforated plates placed into filters, as in Patents Nos. 168,825 and 62,757.

I claim—

In a filter, the combination of the sectional shell A B, having supply-pipe $a$ and discharge-pipe $b$, with the inner filtering sieve or sieves placed into the part B, and with the inner solid spreading-plate, C, held under the pipe $a$, convex side upward, on legs $g$, and ring $h$, and clamped by the part A, substantially as herein shown and described.

JULIUS WODISKA.

Witnesses:
JAMES TURK,
WILLY G. E. SCHULTZ.